United States Patent [19]

Lewis et al.

[11] Patent Number: 4,974,164
[45] Date of Patent: Nov. 27, 1990

[54] DIGITAL MEASURING AND PROPORTIONING INSTRUMENT

[76] Inventors: Gainer R. Lewis, 5367 Yolanda Ave., Tarzana, Calif. 91356; James L. Amstutz, 1633 Greenfield Ave., Los Angeles, Calif. 90025

[21] Appl. No.: 189,470

[22] Filed: May 2, 1988

[51] Int. Cl.$^5$ .............................................. G01B 7/02
[52] U.S. Cl. .................................... 364/562; 33/1 L; 33/707
[58] Field of Search ................ 33/1 F, 1 K, 1 L, 494, 33/503, 706, 707; 356/355, 356, 357, 358, 375; 364/561, 562, 563, 705.01, 715.01

[56] References Cited

U.S. PATENT DOCUMENTS

| | | | |
|---|---|---|---|
| 3,142,121 | 7/1964 | Stefanov | 33/501.6 |
| 3,365,799 | 1/1968 | Fisher | 33/1 L |
| 4,008,523 | 2/1977 | von Voros | 33/784 |
| 4,037,325 | 7/1977 | Weber et al. | 250/237 G X |
| 4,161,781 | 7/1979 | Hildebrandt et al. | 364/562 |
| 4,181,959 | 1/1980 | Tateishi | 364/705.01 X |
| 4,181,960 | 1/1980 | Tateishi et al. | 364/562 |
| 4,195,348 | 3/1980 | Kakutani | 364/705.01 X |
| 4,221,056 | 9/1980 | Koenuma | 33/438 |
| 4,229,883 | 10/1980 | Kobashi | 33/784 |
| 4,233,749 | 11/1980 | Coulter et al. | 364/562 X |
| 4,242,574 | 12/1980 | Grant | 377/18 |
| 4,370,811 | 2/1983 | Triggs et al. | 33/1 M X |
| 4,395,630 | 7/1983 | Ramsden et al. | 250/237 G |
| 4,707,928 | 11/1987 | Bennett et al. | 33/494 X |
| 4,736,313 | 4/1988 | Nishimura et al. | 33/1 L X |
| 4,839,833 | 6/1989 | Parkiskari | 364/562 |

Primary Examiner—Parshotam S. Lall
Assistant Examiner—Edward R. Cosimano
Attorney, Agent, or Firm—J. E. McTaggart

[57] ABSTRACT

A hand-held microcomputer-based ruler-like measuring and calculating instrument, particularly adapted for but not restricted to the graphic arts field, is capable of registering individual size measurements, proportioning successive readings in percent, converting to different units and visually displaying numeric results. The measuring, computing and indicating system has been human-engineered to eliminate fatigue and risk of error associated with conventional methods of repeatedly sizing and proportioning graphics elements. Distance along a fixed ruler scale, gaged by a slider-mounted pointer, is sensed and encoded electro-optically from an internal fixed bar-scale, digitally decoded, registered, processed and displayed. Optional audible indication enables the sliding pointer to be reset manually to a memory-stored reference point without eye contact, simplifying multiple sequential readings and proportioning factor determinations and thus greatly reducing mental and visual effort. Other ancillary functions include the ability to measure and display distances directly in inches, centimeters, picas, or in other user-defined units, to readily convert between any of these units systems, to reference visually to scale marks as typically shown on maps, charts, diagrams and the like, to center an object within an arbitrary span, and to measure distances greater than the actual length of the instrument. Life of the on-board battery is prolonged by pulsing the sensor device light source at a variable sampling rate in an adaptive velocity-feedback loop, and by automatic cutback to a low-power standby mode when not in use. Upon "re-awakening" by a user, recalibration is performed automatically. In the preferred embodiment, the abovementioned functions are controlled by only three user push-buttons and a slider-actuated switch.

29 Claims, 8 Drawing Sheets

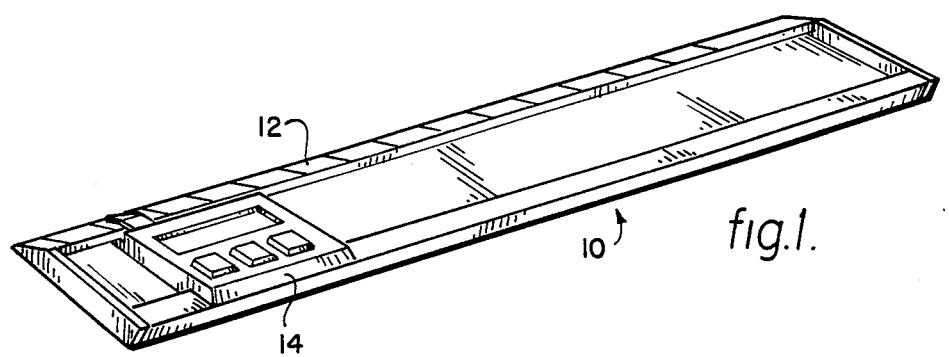
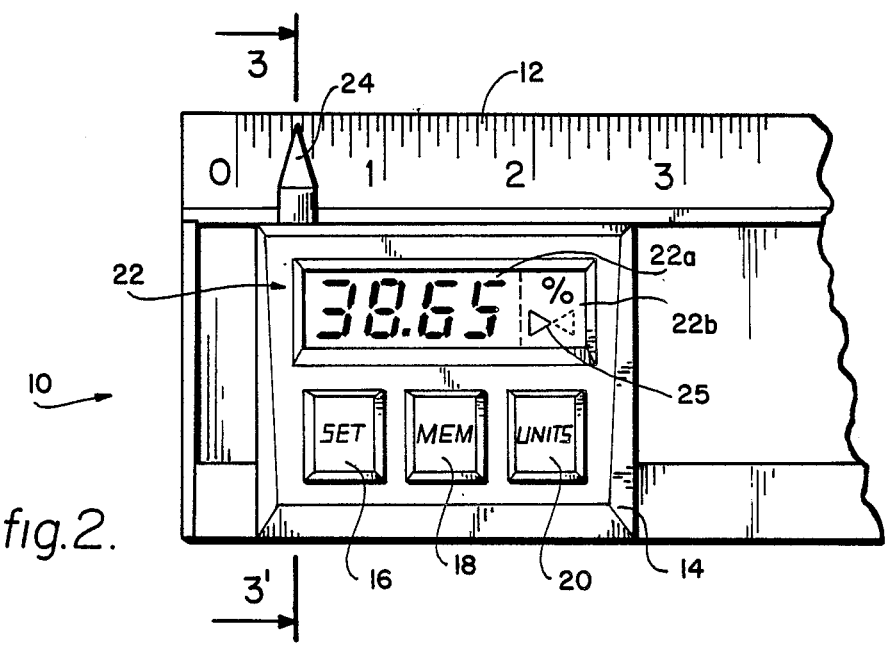
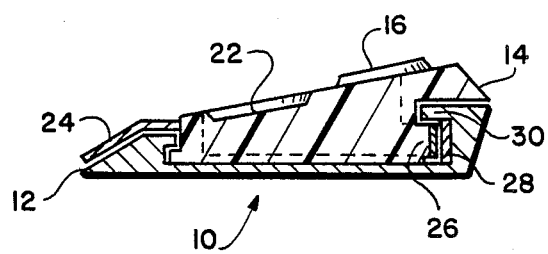

DIGITAL MEASURING AND PROPORTIONING INSTRUMENT

FIELD OF THE INVENTION

This invention relates to the field of microcomputer-based measuring and calculating instruments. More particularly it relates to self-contained hand-held measuring/calculating ruler-like instruments, particularly adapted for but not restricted to the graphic arts field, capable of at least registering individual size measurements and displaying numeric results on a visual display, and preferably having additional capabilities such a setting special instrument scale factors for automatically converting readings to different units systems, storing the value of an initial measurement and then converting the value of any subsequent measurement to a proportioning factor which is displayed as a percentage of the initial measurement, measuring distances longer than the instrument itself, and centering objects relative to an arbitrary span.

BACKGROUND OF THE INVENTION

One of the major tasks that must be performed in the preparation of graphic materials for printed media is the sizing of graphic elements such as photographs, diagrams and the like. Because these graphic elements are usually created without regard to the actual size in which they will appear in the media, graphic production artists must virtually always determine a proportioning factor, expressed as a percentage, as instructions for enlarging or reducing the original element to fit properly in the allocated space in the finished piece. For example, if the desired image size is twice as large as the original, the production artist instructs the printer to "shoot the artwork to 200%." If the desired size is ¾ that of the original, the instructed size will be 75%, and so on.

PRIOR ART

Graphics proportioning percentages are commonly determined using a specialized manual circular slide rule known as a "proportion wheel", in the following manner:

First, the original photograph or art is measured with a ruler along some convenient axis. This measurement is noted. Then the corresponding span along the same axis is measured on the layout for the finished piece. This measurement is also noted. Then the artist rotates the movable part of the proportion wheel so that the original size (as indicated on one scale) is directly opposite the desired finished size (on a second, adjacent scale). With this done, the required percentage factor can be read from a third scale on the proportion wheel. Alternatively, a pocket calculator can be used to determine the percentage factor by dividing the finished size by the original size and multiplying by 100%.

Either of these common methods is cumbersome, time-consuming, and error-prone. Due to the numerous potential sources of error in making the initial measurements, in both the setting and the calibration of the proportion wheel, and in correctly reading the result, it frequently occurs that mistakes are made in sizing artwork, often necessitating the discarding of the initial printing plates or negatives and incurring the delay and expense of making corrected ones. Even when executed perfectly, the sizing process is time-consuming and requires much non-productive and fatigue-inducing hand and eye motion.

Advanced microcomputer technology applied to well-known electro-optical displacement measuring principles opens up the possibility of automating most of the steps of graphics proportioning in a convenient, efficient, battery-operated hand-held instrument capable of efficiently and accurately executing repetitious numeric tasks which are presently tedious, slow and error-prone, thus freeing artists' time for creative, productive activity.

Electro-optical measurement of displacement commonly utilizes the principle of sensing, counting and registering light pulses reflected from (or transmitted through) an illuminated movable scale having a linear light-interrupting array such as a series of alternating light/dark bars (or transparent/opaque regions, as in a perforated strip), interposed in a light path between a light source and light sensor: movement of the bar-scale relative to the sensor generates cyclic light pulses which are transduced by the sensor into electric signals which are then electronically processed and registered as displacement readings. It should be noted that in this basic system, a single sensor is incapable of discriminating direction, so that it has become common to utilize a pair of quadrature-disposed sensors with suitable phase comparison means to register direction as well as displacement.

An early example of an electro-optical measurement device utilizing the dual sensor quadrature principle is disclosed in U.S. Pat. No. 3,142,121 to Stefanov for a micrometer utilizing standard AND and OR logic hardware to derive "left-moving pulses" and "right-moving pulses" which control a conventional counter having a visual display. U.S. Pat. No. 4,233,749 to Coulter and Triggs, for Apparatus for Measuring and Marking Preselected Measurements discloses a microcomputer-based single-sensor electro-optical device; at column 6 line 17 it is noted that "Sensor 18 cannot discriminate direction, and thus tape 20 must be extended evenly and in one direction only."

Electro-optical measuring devices normally require user recalibration, usually by pressing a push-button to reset the counter(s) to zero with the bar-scale and sensor positioned at some reference setting, usually zero displacement.

Initial recalibration is normally required at each startup. Subsequently, during an entire period of operation, each movement of the slider must be counted, added (+ or −) and registered as a cumulative total with absolute accuracy in order for the initial calibration to remain valid. In practice, recalibration may be required from time to time during operation due to counting errors, which have the effect of invalidating the initial calibration by offsetting the effective reference setting. Counting errors may arise from optical anomalies such as dirt or degradation of the bar-scale and, more importantly, excessive velocity of movement of the bar-scale relative to the sensor. Velocity-caused errors arise from counts missed whenever the bar-scale/sensor velocity exceeds a critical value determined by the resolution of the bar-scale in conjunction with the upper frequency-handling capability of the sensor system. One basic limitation is the rise time of the light sensor(s). A non-clocked system such as the Stefanov device is further limited by the speed capability of the logic circuitry and the counter. In a microcomputer-based system the sensor signals are typically processed under control of software programming; the sensor signals may be sampled periodically at a predetermined pulse width and repetition rate, which establishes the speed capability and thus determines the immunity to velocity errors. For example, the Coulter et al device utilizes a commercial one-chip microcomputer having a clock oscillator operating at 300 kHz. the optical sampling rate generally cannot exceed the clock rate, and may be made considerably lower to permit the microcomputer to perform other tasks on a time-shared basis. Standard Nyquist sampling theory limits a baseband signal to less than half of the sampling frequency for error-free sampling.

Electro-optical apparatus directed to basic distance measurement has been utilized in hand-held instruments such as gages, coiled blade rulers and micrometers whose capabilities are limited to the measurement of distance, as exemplified by U.S. Pat. No. 4,008,523 to von Voros, No. 4,229,883 to Kobashi, No. 4,242,574 to Grant, and No. 4,395,630 to Ramsden et al. Such prior art devices, as well as more elaborate non-portable devices such as drafting machines adapted to provide digital displacement indications, as in U.S. Pats. No. 4,221,056 to Koenuma and U.S. Pat. No. 4,370,811 to Triggs et al, fail to address the above-identified needs of the graphics arts field, particularly in regard to proportioning operations, and would therefore fail to meet the requirements addressed by the present invention as summarized in the following objects.

In one approach to the velocity-error problem, the von Varos patent teaches the use of a mechanical dash pot to restrict the velocity to avoid velocity type errors in a micrometer; however, the usual measure taken to avoid such errors in a microcomputer-based device is to make the sampling rate sufficiently high, ideally well beyond that required in normal use.

Power drain, while of little importance in power-line-operated systems, is of particular concern in the hand-held battery-operated instrument of this invention: almost continuous all-day usage is anticipated in the graphic arts field, therefore extraordinary power efficiency is essential to prevent excessively short battery life. Battery-operated hand-held measuring instruments known in prior art, being designed for intermittent duty only, would be expected to experience short battery life.

Long battery life involves special considerations in the intended field:

(a) the user may forget to switch the power off (or to a standby state) when the instrument is not in use, needlessly discharging the battery;

(b) a need for frequent on/off switching by the user to conserve battery power would be an annoyance, especially if recalibration must be performed by the user, as described above, at each startup;

(c) even with a low-powered light source, its power consumption plays a major role in battery life, especially if the light source is operated continuously as in known prior art. In a digital system, the state (on or off) of each sensor element is read periodically at a sampling rate as digital processing input data. The light source need not be kept on continuously; it may be pulsed to turn on only briefly each time the state is to be read. Keeping the light source pulse-width short conserves power by operating the light source at a low duty cycle (on time/total time). With a fixed pulse-width, the duty cycle varies with the sampling rate: making the sampling rate low enough to achieve a duty cycle in the order of 1% would achieve excellent power efficiency, reducing the light source power to about 1/100 of the power it would consume running continuously, however making the sampling rate too low could result in susceptibility to velocity-caused errors from abrupt slider movement.

SUMMARY OF THE INVENTION

It is a primary object of this invention to provide an improved battery-operated hand-held distance-measuring instrument having an electronic digital display.

It is still a further primary object of the present invention to provide graphics artists and others involved in like activities with a battery-operated self-contained hand-held ruler-like instrument, having a built-in microcomputer, capable of measuring size, storing an initial measurement, and then computing and displaying any subsequent measurement as a proportion (percentage) of the initial measurement.

It is a further object to provide in such an instrument a measuring, computing and indicating system which has been human-engineered to drastically minimize the fatigue and error potential associated with conventional methods of repeatedly sizing and proportioning graphics elements.

It is a particular object of this invention to provide in such an instrument a fixed ruler scale, a slider having a pointer, and a numeric digital display adapted to display distance readings and to display the ratio between a stored initial distance reading and any successive reading as a percentage.

A further primary object of this invention is to minimize battery power drain in an improved optically-scanned quadrature-type bar-scale displacement sensing system by pulsing the sensor light source at a variable sampling rate in an adaptive control feedback loop which holds the sampling rate low during normal operation to conserve battery power, but has the capability, upon rapid sensor movement, to automatically increase the sampling rate temporarily as required to avoid velocity-caused errors.

It is a further particular object of this invention to provide a lowpower standby mode, automatically initiated by a designated idle time lapse, in which current settings are retained in memory, and to enable subsequent startup, including automatic zero recalibration, to be initiated by the user moving the slider to an end of its travel range.

It is a further object to provide audible means enabling the sliding pointer to be reset manually, without eye contact, to a memory-stored reference point within its total range, so as to simplify multiple successive readings and scaled distance determinations by greatly reducing the amount of mental and visual effort required.

It is a further object to provide other ancillary functions, such as the ability to read distances directly in inches, centimeters, picas, or any other desired units, along with the ability to easily convert a measurement in one of these units to any other unit system.

It is a further object to provide capability of expressing distances in any arbitrary scale of measurement, and to allow simple calibration of the instrument's measuring and display apparatus to the arbitrary scale through direct visual reference to scale marks as typically shown on maps, charts, diagrams and the like.

A further object is to make the instrument of this invention capable of handling measurements which are longer than the active length of the device itself.

A further object is to provide capability of centering an object within an arbitrary span.

It is still a further object of this invention to simplify user operation by minimizing the number of control push-buttons, and in particular, to control all of the numerous functions in a preferred embodiment with only three push-buttons and a slider-actuated switch.

Study of the drawings and the following description will provide an understanding of the manner of making and using the present invention to achieve the above objectives as well as other benefits and advantages.

BRIEF DESCRIPTION OF THE DRAWINGS

FIG. 1 is a perspective view of a measuring and calculating instrument in accordance with the preferred embodiment of the present invention.

FIG. 2 is plan view of the slider portion of the instrument of FIG. 1, shown located in the left hand portion of the ruler body.

FIG. 3 is a sectional view through 3—3' of FIG. 2.

DETAILED DESCRIPTION

Figure 4:
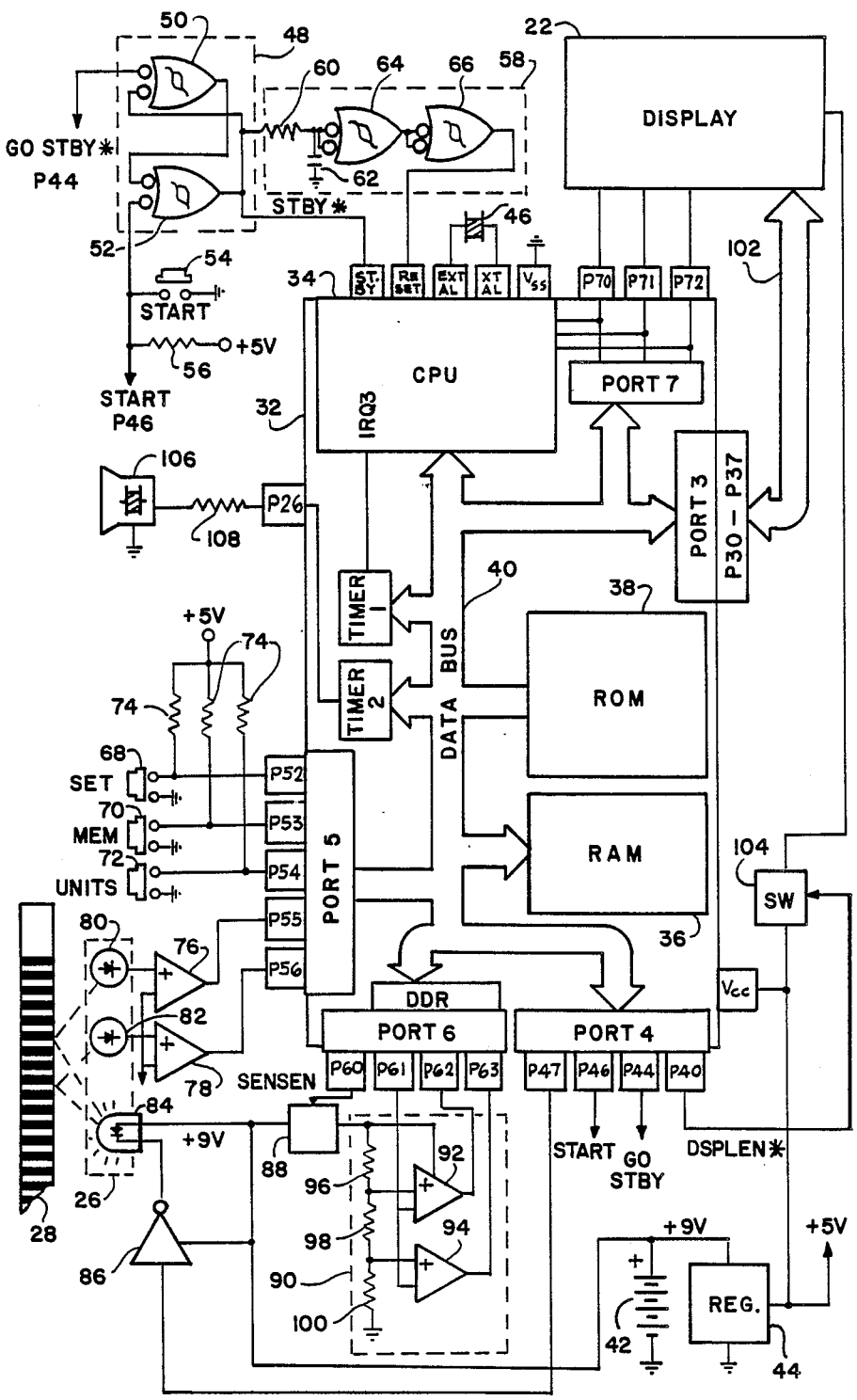
FIG. 4 is a schematic block diagram of the electronic system of the instrument of FIG. 1.

FIG. 1 is a perspective view of an instrument in accordance with a preferred embodiment of the invention, which comprises an elongated ruler-like main body 10 with a ruled scale 12 along one edge, and a slider assembly 14, adapted to slide longitudinally along tracks which hold it captive within an elongated cavity region of main body 10.

FIG. 2 is a plan view of the slider assembly 14, shown at a setting near the left hand end of its travel range in main body 10, shown in part. Slider assembly 14, which contains a microcomputer-based electro-optical measurement and display system, has a mini-keyboard comprising three raised push-buttons; 16, 18 and 20, marked "SET", "MEM" and "UNITS" respectively, a pointer 24 located above the ruled scale 12, and a visual display device 22 having a numeric digital display region 22a occupying a major portion of the display panel to the left, and a mode/status display region 22b occupying a smaller portion to the right.

To operate the instrument, the user first moves the slider assembly 14 to a "home" position at the left hand end of its travel range, where a stop prevents further travel. A miniature switch, known as the "start" switch, located on the left side of slider 14 is positioned such that it will be actuated whenever the slider 14 is moved to the "home" position. Actuation of the "start" switch causes a microcomputer-based electronic system contained in slider 14 to exit a low-power standby mode and resume full operation. The system includes a displacement counting system, which is reset to zero by actuation of the "start" switch. As the slider 14 is then moved slightly toward the right, as it passes through a zero reference position where the pointer 24 lines up with zero on scale 12, the system begins counting and tracking slider displacement. Thus the instrument, having been automatically recalibrated by actuation of the "start" switch, is now operational in the currently selected mode, which may be a distance mode in which the reading of any setting of the pointer 24 on ruler scale 12 will be displayed numerically in display panel 22a.

The UNITS button 20 may be pressed to select a units system from a sequential menu; typically inches, centimeters, picas (printing measure) and user-definable units, the units system selected being identified in display panel 22b as "in", "cm", "picas" and "user" respectively.

To measure an element, the user first aligns the left hand edge of the element with the zero mark on scale 12, which serves as a first gage member, then simply moves the slider 14 to point at the right hand edge of the element with pointer 24, which serves as a second gage member, and immediately the span is displayed in the units selected. At this point another units system may be selected from the sequential menu by simply pressing the UNITS button 20 and the converted reading will be displayed immediately.

To determine a proportioning factor: An initial distance is measured by moving the pointer 24 to gage the desired distance: a corresponding reading is displayed in display 22. Then, pressing the SET button 16 causes the microcomputer to enter a "Percentage" mode, storing this initial distance reading in a memory location, and displaying a reference proportioning factor of "100%" in the display 22. From this point on, whenever the slider 14 is moved, the microcomputer uses the stored reading to calculate a proportioning factor from each new distance gaged by the position of pointer 24 and to display each new reading as percentage of the initial reading. Thus, multiple subsequent readings may be performed easily and rapidly, manipulating only the slider.

A new 100% reference distance may be established at any time by pressing the SET button 16. The distance currently indicated between the zero mark on scale 12 and the pointer 24 becomes the new 100% distance.

A memory function, activated by the MEM button 18 is provided to facilitate the repetitive scaling up or down of several different distances by the same percentage factor. Once the desired percentage factor has been determined as described above, the user may then press the MEM button 18, to cause this factor to be stored by the microcomputer.

From this point on, until the memory is cleared or changed, the instrument provides both audible and visual indication of the current position of the pointer 24 relative to the memorized percentage. Specifically, when the pointer 24 is to the left of the position corresponding to the memorized percentage, a right arrow symbol 25, as shown, is displayed in the mode/status region 22b of the display 22, and simultaneously a first distinctive sound effect is produced by an audio transducer, which may be located within slider 14. When the pointer 24 is at the memorized position (plus or minus a predetermined tolerance), an "M" is displayed and a second distinctive sound effect is perceived. When the pointer 24 is to the right of the memorized position, a left arrow is displayed and a third distinctive sound effect is produced. It has been found appropriate to program the microcomputer so that the first and third distinctive sound effects are in the form of a tone of descending pitch as the pointer moves toward the memorized position from either direction, causing a very low frequency (or absence of sound) at the memorized position. Alternatively, a repetitive "beep" could be made to change in repetition rate and/or pitch with pointer displacement. The microcomputer may be programmed to provide a chosen combination of pitch and/or repetition rate in the audible indicator to located desired pointer positions and directions of movement, eliminating any need for visual reference to the display 22, and eliminating the need to even remember the desired percentage factor.

Audible indication is an optional operating aid, and is not essential to any of the functions of the instrument. The audible indication feature may be disabled by depressing the MEM push-button while performing the normal "wakeup" procedure of moving the slider against the left end stop.

The principal value of memory capability occurs when a new 100% reference point is established by pressing SET button 16. Note that the memorized value stored when MEM is pushed is in actuality a percentage factor, and not an absolute position. Thus, if a new 100% point is established with the SET button 16, the visual and audible "memory" annunciators will now indicate a new distance equal to the new "set" distance multiplied by the percentage factor previously stored by pressing the MEM button 18.

Thus, proportioning a whole series of measurements to a new size may be accomplished simply by first establishing the desired percentage factor and storing it by pushing the MEM button 18. Then each successive dimension is measured on the original graphic, and SET button 16 is pushed. Then, by simply moving the pointer 24 until the audible or visual indicator indicates the "M" position, the corresponding proportioned distance is indicated by the pointer 24.

For maps or charts having an arbitrary scale, the instrument may be calibrated to that scale so that measurements may be made directly in the target units. This "User Units" mode is selected by pressing the SET and UNITS buttons 16 and 20, causing the auxiliary display 22b to indicate "user". Beginning with a known dimension on the map or chart of interest, the pointer 24 is moved until the displayed numeric value matches the magnitude of this known reference distance. At this point, the SET button 16 is depressed and held down, thereby causing the microcomputer to freeze the digital display 22. With the SET button 16 held down, the pointer 24 is moved until it spans the reference distance on the map or chart. At this point, the SET button 16 is released, and the instrument is now correctly calibrated with a scale factor which enables it to directly read distances in map or chart units.

The microcomputer provides a separate, independent storage location for the "user" memory function in the "User Units" mode. This function is handled in a manner analogous to the percentage memory: when the MEM button 18 is pressed, the numeric value currently in the display 22a is stored in the "user" memory location. Whenever values close to this stored value subsequently occur in the "User Units" display, the visual and audible annunciators are activated as previously described. A typical use of this "user" memory capability is determining the position of points on a map and plotting these same points on another map drawn to a different scale.

An optional additional capability of range doubling may be provided, effectively doubling the length of the instrument, by programming the microcomputer to enter a doubler mode if the SET button 16 is depressed with pointer 24 positioned beyond the right hand end of the ruler scale 12, the "Doubler" mode being suitably indicated on display 22b. In the "Doubler" mode, assuming scale 12 is 12" long, the instrument is used in the manner of using an ordinary 12" ruler to measure objects between 12" and 24" long: the zero mark of scale 12 is lined up with the left hand edge of the object, the full scale mark of scale 12 is marked or noted on the object, then the instrument 10 is moved physically to the right to line up the zero mark of scale 12 with the mark corresponding to the previous full scale position, then when the pointer 24 is lined up with the right hand edge of the object, the display 22 will automatically include an initial 12" to read out the length of the object, just as if the instrument were the right hand half of a 24" ruler. This eliminates the bulk and awkwardness of a very long scale, while providing sufficient working length for almost any application. To cancel range doubling, the user simply moves slider 14 to the "home" position at the left hand end of its travel, then proceeds normally.

As a measuring instrument for maps and the like, the device of the present invention is believed to be more flexible and easier to calibrate than prior art devices. The novel principles and calibration procedures of this device are also adaptable to measuring instruments which utilize wheels drawn across the map rather than a movable pointer on a ruler.

It should be noted in particular that the user is never required to key in any numeric data, whether distances, proportioning factors, or any other quantity: all numeric quantities are automatically derived by manipulating the instrument's slider, containing the sensing assembly and associated pointer, in each current user-selected mode of operation.

Another key aspect of the instrument is the use of techniques to minimize wasted motion and the need to avert the user's eyes from the workpiece. The standard sizing function can be performed by pressing a single button, and the user's eyes need never leave the work until the final answer is read from the numeric display. When the instrument's memory function is used to store a proportioning factor, any number of different dimensions may be proportioned to the same factor without any need to look at the instrument's display 22. The user need only move and watch the pointer; audible indication from the transducer provides all the information needed.

A further optional centering capability may be provided with appropriate programming. If the special key combination (SET+MEM) used to select the centering function is pressed while in "Percent" mode, the microcomputer is programmed to modify the scale factor of its display calculation function, with no change in the currently displayed reading, so that upon further slider movement the displayed value changes twice as rapidly with slider motion as in the normal "Percent" mode. At the same time, a special "center" mode flag replaces the "%" flag in the mode/status display 22b. These adaptations allow the instrument to calculate the centered position of any object in an arbitrary space, in the following procedure:

First the slider 14 is moved to an initial setting so that the object to be centered is spanned by the position of pointer 24 and the fixed zero mark on scale 12. The SET button 16 is pressed, switching the device into "Percent" mode and causing this initial reading to be displayed as 100%. Then the slider 14 is moved to a second setting to gage the arbitrary span, which will, as usual, be displayed as a percentage of the initial reading established by pressing the SET button 16. At this point, pressing a special key combination (such as SET and MEM simultaneously) causes the device to enter a "Centering" mode, which is achieved by doubling the currently established instrument scale factor such that, although the current displayed value remains unchanged as long as the slider remains at this second setting, any subsequent slider displacement will cause the display to change twice as much for a given slider movement as normally. A special symbol in the mode/status display 22b indicates that the "Centering" mode is active. If the user then moves the slider until the display reads 100%, the pointer will indicate the proper position for the right hand edge of the object to be centered. If the user further moves the slider until the display reads 0%, the pointer will indicate the center of the arbitrary span. If the user further moves the slider 14 until the display 22 reads −100%, the correct position of the left-hand edge of the object to be centered will be indicated. Note that this sequence of steps works correctly even if the object to be centered is wider than the predetermined span, except that the slider 14 will be stopped by the left-hand edge of the track before it can be moved all the way to −100%.

FIG. 3 is a section taken through line 3—3' of FIG. 2, showing the beveled region beneath scale 12, with pointer 24 located immediately above. Beneath the exposed upper portion of slider assembly 14 is a lower portion, containing the electronic circuitry including electro-optical position sensing assembly 26 which interfaces optically with an elongated linearly-marked bar-scale 28 attached to the inner rear wall of main body 10 beneath an upper flange 30. Bar-scale 28 and flange 30, which appear in cross-section, extend along the length of main body 10.

FIG. 4 is a schematic block diagram of the microcomputer-based electronic system of the preferred embodiment of this invention, located within the slider assembly 14 as described above. The main functional block is an LSI (large scale integrated circuit) microcomputer 32, comprising as its major internal functional elements a CPU (central processing unit) 34, a 192 byte RAM (random access memory) 36, a 4 kilobyte ROM (read only memory) 38, two timing circuits shown as timer 1 and timer 2, an input port shown as port 5 having terminals P52 through P56, port 3 having terminals P30 through P37, port 4 having terminals P40, P44, P46 and P47, port 6 having terminals P60 through P63, and port 7 having terminals P70, P71 and P72; each of these elements being interconnected by data bus 40 as shown. For simplification, additional unused ports and terminals are not shown.

External to microprocessor 32, a 9 volt battery 42 is connected to voltage regulator 44 which provides a +5 volt supply line powering microcomputer 32 at terminal Vcc as well as providing a +5 V bus for peripheral circuitry. A conventional 4 MHz quartz crystal 46 is connected to EXTAL and XTAL terminals of CPU 34. A standby flip-flop circuit 48 comprises two gates as shown: gate 50 having an input connected to terminal P44 of Port 4 by a GOSTBY* (go standby: * indicates active LOW) line, and gate 52 having its input connected to terminal P46 of Port 4 and to a first terminal of "start" switch 54 which is a SPST miniature push-switch, and has its second terminal connected to ground. "Start" switch 54 is mounted on the slider assembly so as to be actuated to a closed state when the slider is moved to its left hand end "home" position, forcing the START* line to a LOW (active) state; otherwise the START* line is held to a HIGH state by pull-up resistor 56, connected between the START* line and the +5 v bus.

The output of flip-flop circuit 48, at gate 52 output, is connected to the STBY terminal of microcomputer 32 and to the input of time delay circuit 58 comprising an RC low-pass filter made up of series of resistor 60, shunt capacitor 62 and a pair of gates 64 and 66 connected in tandem as shown, providing a control signal, delayed by approximately 40 milliseconds, to the RESET* terminal of CPU 34.

At the input Port 5 of microcomputer 32, a SET* line runs from SET push-button 68 to terminal P52, a MEM* line runs from MEM push-button 70 to terminal P53, and a UNITS* line runs from UNITS push-button 72 to terminal P54. Each of these 3 push-buttons is SPST and has its second terminal connected to ground. Each of the three lines has a pull-up resistor 74 connected to the +5 V bus, so that each line is normally in a HIGH state (inactive), but will be forced LOW (active) when its related push-button is depressed.

Also at input Port 5, a pair of sensor amplifiers 76 and 78 drive terminals P55 and P56 respectively, and receive inputs from a pair of light sensors 80 and 82 respectively. These sensors, which may be light-sensitive diodes, are part of sensing assembly 26, which also contains a light source 84, which may be one or two LEDs (light emitting diodes). Light source 84 is controlled by a switching driver 86, which may be formed from a pair of conventional transistors, receiving control input from terminal P47 at microcomputer Port 4.

At Port 6, a SENSEN (sense enable) signal from terminal P60 is supplied to the control input of an electronic switch 88 connected between the +9 V battery bus and a battery voltage dual comparitor circuit 90 comprising LBAT (low battery) comparitor 94 and LLBAT (very low battery) comparitor 92, each receiving at its {−} input a +5 volt reference voltage from terminal P61. The {+} inputs of comparitors 92 and 94 are connected as shown to a voltage divider formed by three resistors 96, 98 and 100 connected in series between the switched 9 V line and ground. The comparitor circuit 90 provides two outputs: an LBAT* (low battery indicated by logic LOW) signal output from comparitor 94 to terminal P63 and an LLBAT* (very low battery indicated by logic LOW) signal from comparitor 92 to terminal P62.

Microcomputer 32 drives the display panel 22 through a data bus 102 from terminals P30 through P37 at Port 3, and through three input/output control lines at terminal P70, P71 and P72. Display panel 22 is powered from the +5 V bus through electronic switch 104 whose control input is connected by a DSPLEN* (display enable) line to terminal P40.

An audio output device 106, which may be a piezoceramic transducer, has one terminal grounded and the other connected through a series resistor 108 via terminal P26 to an output of Timer 2 in the microcomputer 32.

Slider position sensing is performed by a quadrature type linear position encoder system in which light source 84 illuminates bar-scale 28, which is a linear array of alternate reflective and non-reflective (white and black) bars of equal width as shown, and is fastened inside the ruler body as previously described. Sensors 80 and 82 are located within optical light-guides so as to selectively sense directed light beams from source 84 reflected from bar-scale 28 as indicated by the dotted lines in FIG. 4, so that when the sensing assembly 26 is moved, along with slider 14 and pointer 24, sensors 80 and 82 transition cyclically between off and on as sensing assembly 26 moves past the bars on bar-scale 28. The physical separation between sensors 80 and 82 is chosen so as to cause a 90 degree phase difference between the transitions of their respective cyclic signals: this quadrature relationship enables a decoding routine programmed into ROM 38 of microcomputer 32 to determine the direction of the displacement. The on/off state of sensors 80 and 82, as determined by the position of bar-scale 28, are read periodically at a designated sampling rate, yielding a two bit digital code, the bits referring to the dark/light state (0/1) of sensors 80 and 82 respectively, and by comparison with the most recent prior code, the direction of displacement, if any, can be determined. The amount of displacement is continuously monitored by cumulatively summing the decoded transitions, in effect up/down counting the bars passing the sensing assembly 26. Thus the direction and distance of any movement of pointer 24 are registered by microcomputer 32.

As an alternative to the reflective mode described above, a transmissive mode could be utilized: strip 28 would be made to have alternate opaque and transparent bars and would be interposed between the light source 84 and the sensors 80 and 82. The actual width of each bar on strip 28 must be made small enough to provide required resolution in the displacement sensor system; for example 1 mm bar width provides 0.5 mm resolution. The scale chosen need not correspond to any particular system such as inches or millimeters since an arbitrary scale is easily converted in the programming of microcomputer 32.

The wavelength of light employed is a matter of design choice; infra-red operation is preferable in avoiding possible interference from extraneous light leaking into sensors 80 and 82.

An automatic power cutback feature is provided by programming the microcomputer 32 to sense a predetermined period such as 5 minutes of inactivity (no user input), upon which it generates a GOSTBY* signal at terminal P44 and thus at the input of gate 50, actuating the flip-flop circuit 48 which delivers a STBY* (standby) input to terminal STBY* of the CPU, causing the system to cut back to a low power standby mode. In this standby mode, the operating supply voltage of display unit 22 is held off by electronic switch 104, and lamp driver 86 is held in a turned off state, so as to conserve battery power in the standby mode, while the microprocessor 32 remains partially powered to retain most recent data in memory and remain responsive to a subsequent "Awaken" command initiated via start switch 54 when the user moves the slider to its home position.

The instrument may be activated again by moving the slider to the "home" position against the left hand stop. Each time this is done, the circuitry associated with position-sensing assembly 26 is re-initialized. Thus, since the system always "wakes up" in a known position, namely zero reference, and an automatic calibration is performed, manufacturing tolerances are greatly relaxed and accuracy is assured.

Battery condition testing is performed periodically under control of a program in ROM 38 which generates a brief pulse on the SENSEN line at terminal P60, once every few minutes, actuating electronic switch 88 to apply +9 V battery voltage to the comparitor 90, to perform a battery condition test. A fraction (predetermined by the values of resistors 96, 98 and 100) of the battery voltage, at the non-inverting $\{+\}$ inputs of the comparitors is compared with the +5 V reference voltage from terminal P61 applied to the inverting $\{-\}$ inputs. With normal battery voltage the $\{+\}$ inputs are more positive than the $\{-\}$ inputs so both comparitor outputs remain HIGH (non-active). However with a weak battery, the $\{+\}$ input of LBAT comparitor 94 falls below the reference voltage at the $\{-\}$ input, causing the output to deliver a LOW (active) signal to terminal P63, which commands the CPU to flash the display 22 to indicate a low battery condition. Similarly when the battery voltage becomes still lower, the LLBAT comparitor 92 activates terminal P62 to command the display 22 to indicate very low battery condition by a suitable warning such as displaying the word "BATTERY".

The detailed operation of the instrument may be better understood from the following technical descriptions.

Position and direction of the slider are determined using the well-known quadrature encoding principle, wherein, due to the quadrature positioning of the two sensors in the sensing assembly, their logic states (dark/light=0/1) prior to and after any single transition of either output uniquely determines the direction of motion, a transition being the rise or fall of the output signal from a sensor each time its light input changes from light to dark or from dark to light.

A memory register in the microcomputer is utilized as a position counter, and is appropriately incremented or decremented for each detected transition up or down. A value is also maintained in a separate memory location, the "direction flag", which indicates the current direction of motion; left, right, or stopped.

Figure 5:
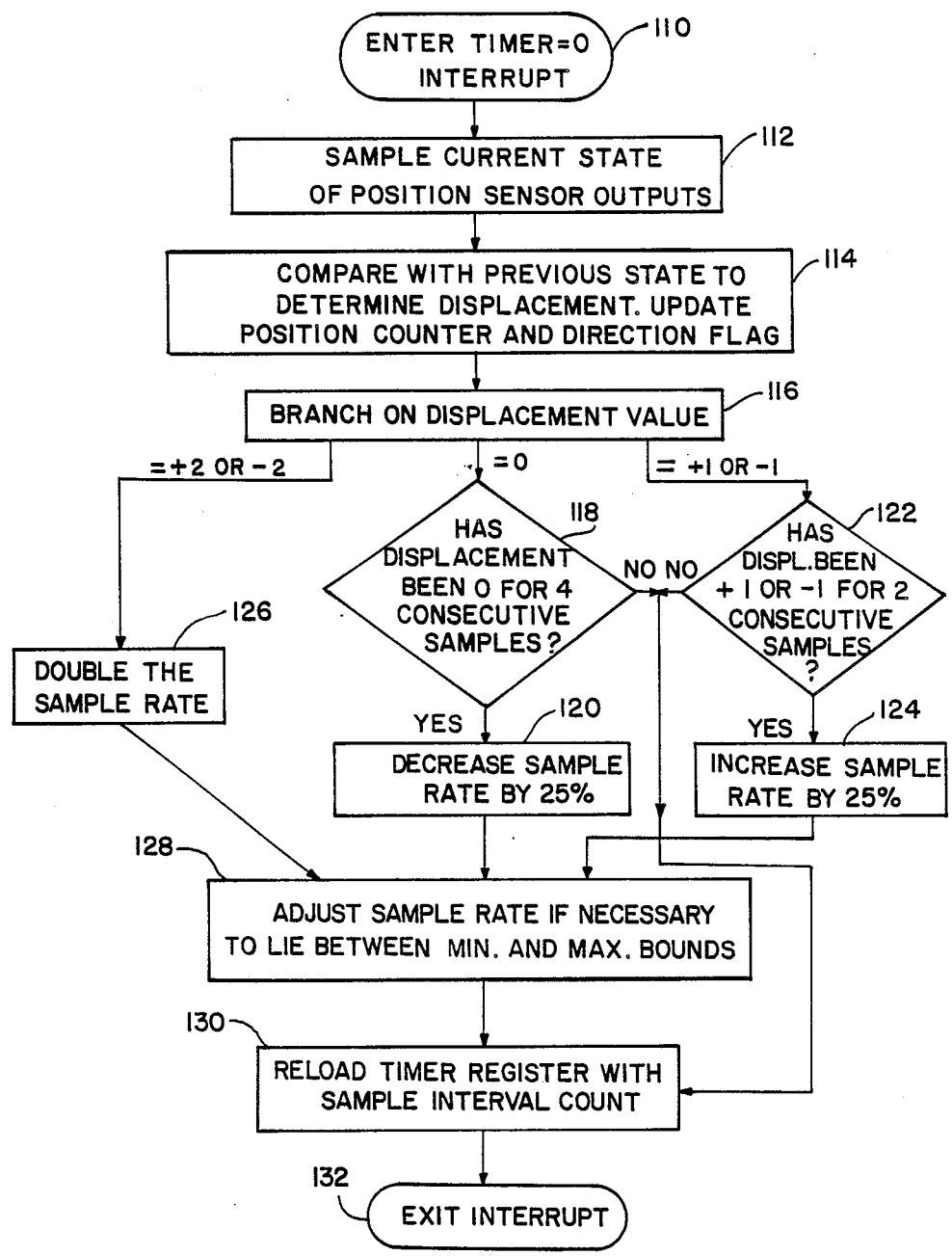
FIG. 5 is a processing flow diagram of quadrature position sensing with adaptive sample rate, as taught by the invention.

FIG. 5 is a processing flow diagram outlining the algorithms for sensing and registering displacement of the slider from inputs received by the microcomputer from the optical sensors, and for adjusting the sampling rate in accordance with sensed slider velocity. Sampling rate control is exercised by timer 1 of the microcomputer, utilized as a timer register, which is recurrently loaded by software with a desired value, and then incremented by a constant clock frequency. When the register reaches the value 0, an interrupt signal to the microcomputer is generated, as indicated at step 110, causing the time-shared microcomputer to temporarily suspend execution of its current program, save any data in process, and jump to a special interrupt service routine, at step 112, which samples the current light/dark state of each of the two sensors.

Then, in step 114, this data is compared with data from the previous sample, yielding an incremental slider displacement value as well as a direction sign, from which the position counter and direction flag are updated.

Then, at decision box 116, the data from step 114 is tested for three possibilities:

(1) if the incremental displacement value is zero, then in decision box 118, if it has been zero for four consecutive samples the decision is made to decrease the sample rate by 25% in step 120, otherwise the program proceeds directly to step 130;

(2) if the incremental displacement value is +1 or −1, then, in step 122, if the value is the same as previous value the decision is made to increase the sample rate by 25% in step 124, otherwise the program proceeds directly to step 130; or (3) if the incremental displacement value is +2 or −2, this indicates a forbidden fault condition, since the quadrature arrangement normally allows only one of the sensors to transition between each sampling: since this reading indicates excessively high slider velocity, the decision is made to double the sample rate in step 126.

Any change of sample rate determined in (1), (2) or (3) above is reviewed in step 128, and adjusted, if necessary, to keep the sampling rate within its designated range limits.

In step 130, where the timer register becomes reloaded for the next sample interval, any update of sample rate determined in step 128 is implemented by reloading the timer with an appropriate sample interval count: the value loaded into the timer register controls the sampling rate; smaller values result in faster sampling, and vice versa: for example doubling the count halves the sample rate. Then in step 132 the interrupt is exited and the microcomputer resumes main program activity.

It should now be apparent that in use, the microcomputer may continually adjust its position sampling rate between two extremes. The lower extreme, or minimum sampling rate, is determined by the need to detect rapid accelerations of the slider from the rest position—as could occur, for example, if the slider were tapped smartly with the finger—without missing transitions in the position encoder and hence losing track of the slider's correct position. In the embodiment shown, with slider at rest, the sampling rate is made approximately 500 pulses per second, and the light source is pulsed at this rate, at a pulse-width of approximately 30 microseconds, to allow settling prior to each sensor sampling, so that the duty cycle is held to about 1.5% to conserve battery drain. At the higher extreme, the maximum sampling rate must be sufficiently fast to avoid missing transitions at the maximum anticipated slider movement velocity. In the embodiment shown, the maximum sampling rate is 4,000 samples per second, corresponding to a slider velocity in excess of 3 feet/second, and a light source duty cycle of 12%.

The sampling rate adjustment algorithm is designed to continuously adjust the sampling rate between these two extremes, keeping it as low as possible to conserve battery power, while keeping it high enough to sense all encoder transitions with a high confidence level. Accordingly, the algorithm shown attempts to maintain a rate corresponding to 2 to 3 samples per encoder transition. Whenever the slider velocity increases to the point that there are less than two samples per transition, that is, transitions are detected on two successive samples, the sample rate is increased by 25%, and when the slider velocity decreases such that there are 4 or more samples per transition, the sample rate is decreased by 25%. Thus the sampling rate is varied automatically in 25% steps in accordance with the sensed slider velocity.

The algorithm also takes advantage of the fact that certain "illegal" transitions in the (quadrature) position sensors—those in which the state of *both* sensor outputs changes between successive samples—can be interpreted as a double transition (i.e., two counts) in an indeterminate direction. If, however, the current direction of slider motion is known, these "illegal" transitions—which occur because the current sample rate is insufficient—can be safely assumed to be double transitions in the current direction of motion.

The microcomputer is programmed to continuously keep track of the direction of slider motion, which is indicated unambiguously by the "legal" encoder transitions in which only a single sensor changes state between successive samples. Thus the instrument is able to recover from momentary periods of insufficient sample rate (caused by sudden accelerations of the slider 14) without losing absolute position. As seen in decision box 126 in FIG. 5, each detection of such an "illegal" transition (plus or minus two counts) causes an immediate doubling of the sample rate.

Figure 6:
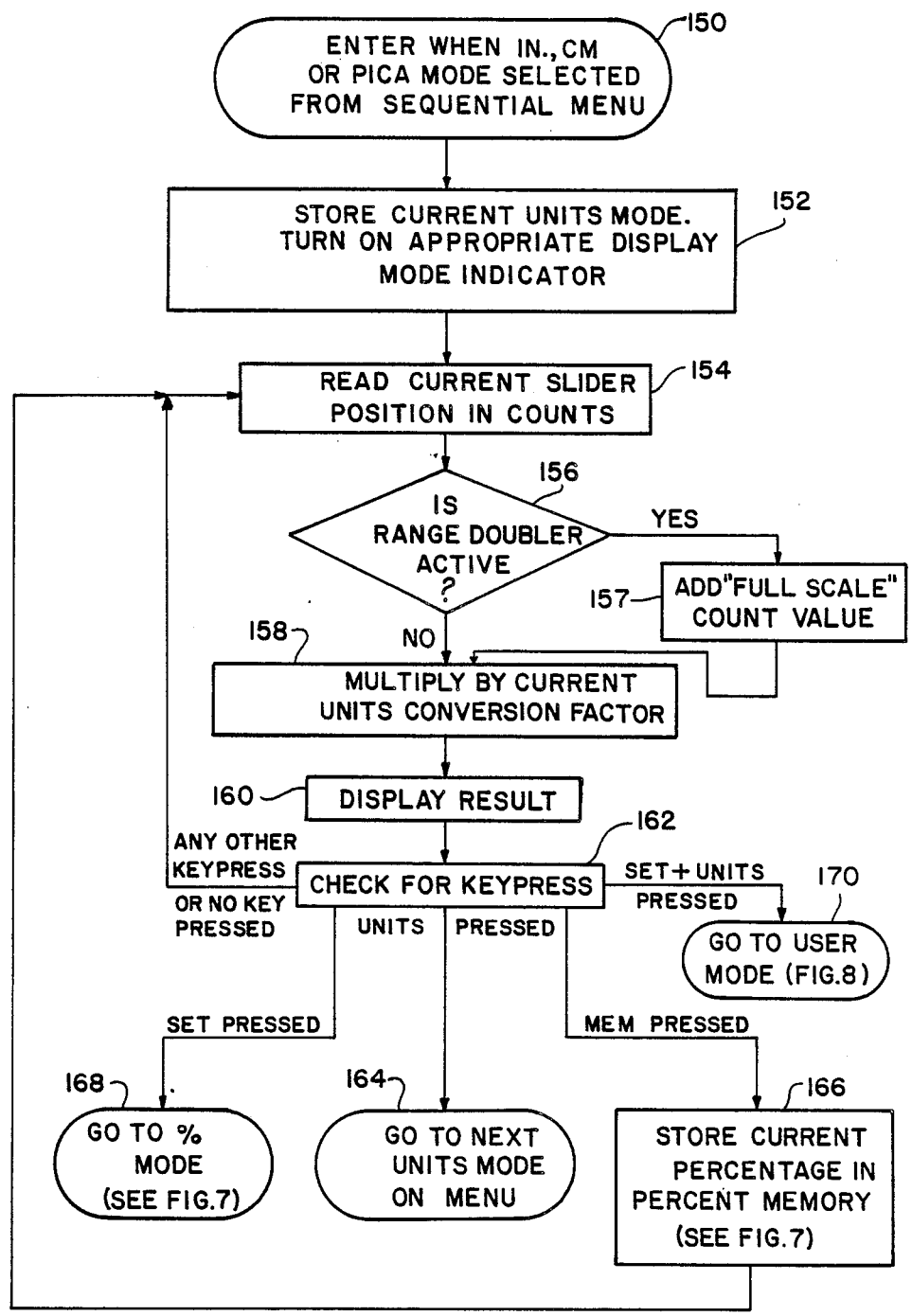
FIG. 6 is a processing flow diagram of "Measurement" mode processing as taught by the invention.

FIG. 6 is a processing flow diagram outlining the algorithms associated with "Measurement" mode processing. When a user prepares to make a measurement, and requires a units system other than that currently selected as indicated on the display, he presses the UNITS key (button) repeatedly to display the units menu choices sequentially. As indicated at 150, the "Measurement" mode is initiated at each UNITS keystroke. As indicated at 152, the units mode selected is stored in the RAM and an appropriate mode indicator is displayed.

Then, at step 154, the current slider position is read from a position count register in the RAM. This count is continuously updated by an interrupt routine, which was described in reference to FIG. 5.

Then at step 156, if the "Range Doubler" option is not active, the program proceeds directly to step 158; however, if the "Range Doubler" option is active then at step 157, the appropriate full scale reference count value is added to the current position count before continuing to step 158 where the count expressing the current slider position is multiplied in the CPU by an appropriate conversion factor for the units selected, and then in step 160 the numeric result is displayed.

Figure 7:
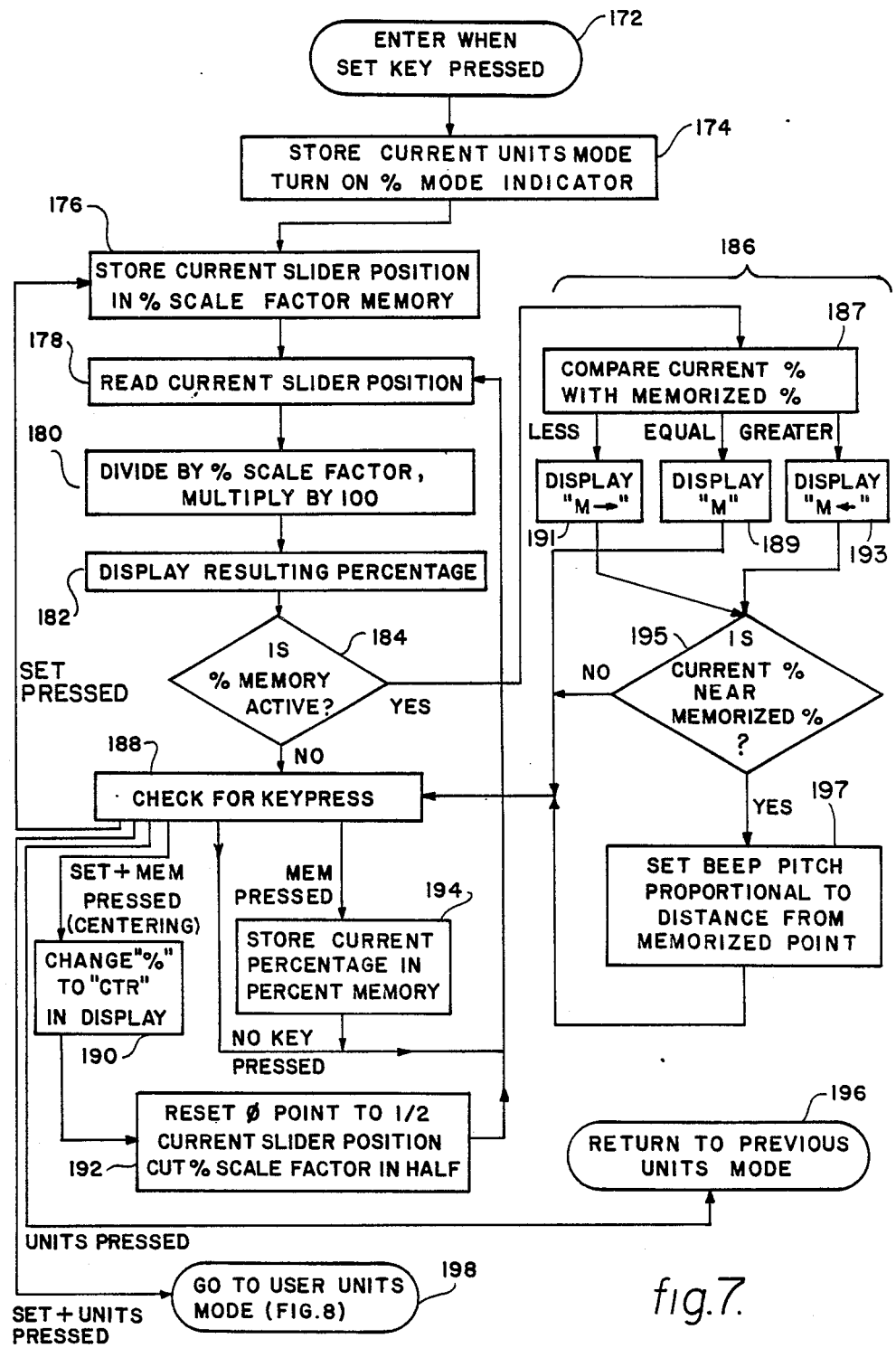
FIG. 7 is a processing flow diagram in the "Percent" mode, as taught by the invention.
Figure 8:
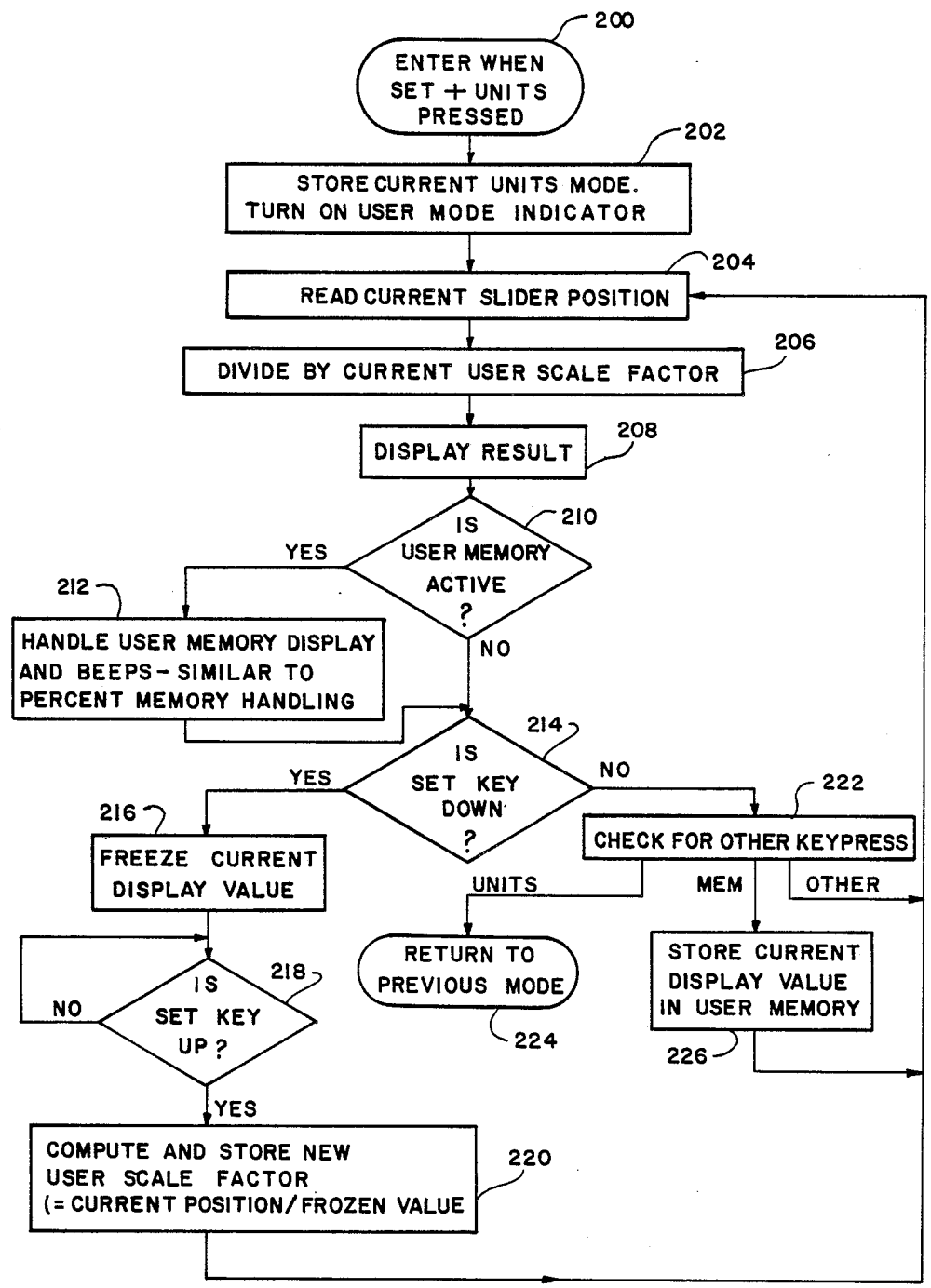
FIG. 8 is a processing flow diagram in the "User" mode, as taught by the invention.

At this point, as indicated at 162, the three user control keys (buttons) are interrogated for any further keystrokes. There are 5 possibilities:

(1) in the absence of a valid keystroke, the program loops back to step 154 and continues looping until a valid keystroke is entered in the three-button mini-keyboard, (2) if UNITS is pressed, then as indicated in 164, the program returns to entry step 150, using the next units system as selected from the sequential menu and displayed, (3) if MEM is pressed, then as indicated at 166, a virtual current percentage value is calculated in the CPU and stored in a percent memory location in the RAM for possible subsequent recall, (4) if SET and UNITS are pressed together, then as indicated at 170, the program enters the "User" mode which will be described below in reference to FIG. 8, or (5) if SET is pressed, then as indicated at 168, the program enters the "Percent" mode, which is next described in reference to FIG. 7.

FIG. 7 is a processing flow diagram outlining the algorithms associated with the "Percent" mode. The instrument's flexible percentage scaling capability is achieved by programming the microcomputer to accept a SET command at any slider position, indicated at 172 in the flowchart, causing the current units mode to be stored and the "%" to be indicated as in 174. Then the current slider position (expressed in physical encoder "counts") is redefined as the new "100%" reference distance and stored in a "% scale factor memory" location in RAM, as indicated at 176.

Once this 100% reference point has been established, any slider movement detected at 178 causes the display to be updated with a new percentage value calculated by dividing the distance value of the new slider position by the stored reference distance (both expressed in physical encoder "counts") and multiplying by 100 to obtain the result in percent as indicated in 180 and 182.

At decision box 184, a test is made to determine if "% memory" has been activated; if so, the program goes to subroutine 186 before proceeding to 188: in subroutine 186 at step 187 the current % is compared with the memorized %: if the current % is less than the memorized % then "M→" is displayed at step 191 and step 195 is initiated; on the other hand, if the current % is greater than the memorized % then "M←" is displayed at step 193 and step 195 is initated. At step 195, if the current % differs from the memorized % beyond a predetermined limit, then the program proceeds directly to step 188; but if the current % approaches the memorized % within the limit, then at step 197, an audible beep is caused to be sounded, having a pitch proportional to the difference between the current % and and the memorized %, thus providing an audible indication of the distance of the current slider position from the memorized point. It should be apparent that subsequently moving the slider toward the memorized point will, through reiteration of subroutine 186, distinctively modify the audible indication. Then if and when the slider is moved precisely to the memorized point, the comparison at step 187 will initiate step 189, displaying "M" and then proceeding directly to step 188. Thus, regardless of what new 100% reference position may have been established (via SET), the microcomputer continually checks whether the slider's currently displayed percentage is close to the memorized percentage, and if so, visible and audible indicators are generated as previously described with reference to FIG. 2.

At decision box 188 the program checks for user keypress inputs; there are six possibilities:

(1) if no key (button) is pressed, the program loops back to 178 as indicated, (2) if SET is pressed, the program loops back to 176 to establish a new 100% distance, (3) if SET and MEM are pressed, the program enters a centering mode, as previously described in reference to FIG. 2, as indicated in 190 and 192, before looping back to 178, (4) if MEM is pressed, then, in 194, the currently displayed percentage is stored in the "% memory" location in RAM before looping back to 178, (5) if UNITS is pressed, then the program returns to the previous units mode as indicated at 196, or (6) if SET and UNITS are pressed, the program goes to the "User Units" mode at 198, described below with reference to FIG. 8.

For audible position indication, the microcomputer is capable of generating tones of varying pitch through the piezoceramic transducer by using one of its internal timer/counter registers. This register is incremented by a constant frequency derived from the microcomputer's clock, and may be configured via software instructions such that whenever its contents equal a predetermined "time constant" value stored in a separate register, the logic state of a dedicated output line (P26 in FIG. 4) is inverted and the timer/counter register is simultaneously cleared to zero. Thus a square wave of 50% duty cycle is automatically produced at the dedicated output line. In the present instrument, the dedicated output line is connected to the audio transducer through a current-limiting resistor, which both protects the microcomputer's output circuitry and establishes the volume of the produced sound. By changing the value stored in the time constant register via software instructions, the instrument is enabled to produce audible tones of virtually any desired frequency.

FIG. 8 is a processing flow diagram outlining the algorithms associated with the "User Units" mode, which gives the instrument the ability to measure in arbitrary, user-calibrated units. In this mode, the user must establish the instrument's scale factor for converting from physical encoder "counts" to target units by performing a "SET" operation while in "User Units" mode. The microcomputer is programmed so that, when the instrument is in "User Units" mode, the digital display is frozen when the SET key is depressed, and remains frozen as long as SET is held down. When, in turn, SET is released, the currently displayed (frozen) value is used in conjunction with the current slider position (in physical counts) to determine the new "User Units" scale factor.

The "User Units" mode is entered as indicated at 200 when SET and UNITS are pressed simultaneously, causing the current units mode to be stored and "User Units" mode to be indicated at step 202. Then the current slider position is read from RAM at 204, this value is divided by the current user scale factor at 206, and the result is displayed at 208. Then, at 210, if the user memory is not active, the program proceeds directly to 214; however, if the user memory is active, the program, before proceeding to 214, enters and executes subroutine 212 which is the same subroutine utilized in the "percent mode" as previously described in reference to FIG. 7, item 186 to handle the user memory visual and audible direction indicators (displayed arrows and beep pitch).

At 214, if SET is being held down, at 216 the current displayed value is frozen, and then at 218 the up/down state of the SET key is interrogated; if it is sensed as not up (i.e. held down), no further action is taken other than repeated sensing as long as it remains held down; however, upon release of the SET key, a new user units scale factor (current position/frozen value), is computed and stored at 220 and the program returns to step 204, reading the current slider position in the newly-selected user units.

At 214, if SET is not being held down, the keyboard is interrogated: in step 222

(1) if UNITS is pressed, the program returns to the previous mode in step 224;

(2) if MEM is pressed, the current displayed value is stored in the user memory in step 226, and the program returns to step 204; or (3) for any other keystroke, the program returns to step 204, reading the current slider position in the current user units.

To practice this embodiment of the invention, the key task is in implementing the microcomputer system. The microcomputer chip utilized is a standard off-the-shelf type HD6301X0, commercially available from Hitachi Corp., U.S.A., utilizing well-known state-of-the-art computer architecture, clearly described in available technical literature. The CPU, RAM and ports are of fixed design, while the ROM is intended to be initially programmed to customer specifications. This is readily accomplished by programmers of ordinary skill in this field, from the information provided herein, particularly the flow diagrams of FIGS. 5, 6, 7 and 8 and supporting text, to implement the subject measuring instrument. The normal industry procedure is to prepare, test and "debug" the microcomputer object code, and then load it into a PROM (programmable read-only memory) for delivery to the integrated circuit manufacturer for the development of masks for preloading the program into the microprocessor ROM during wafer fabrication in production.

In the preferred embodiment, pull-up resistors 56 and 74 are 27k ohms, resistor 60 is 560k ohms, resistors 96, 98 and 100 are 1.8k, 1.2k and 22k ohms respectively, and capacitor 62 is 0.1 microfarad. Switching driver 86 and electronic switches 88 and 104 are easily implemented with well-known switch circuits employing transistors such as 2N3906.

Figure 9:
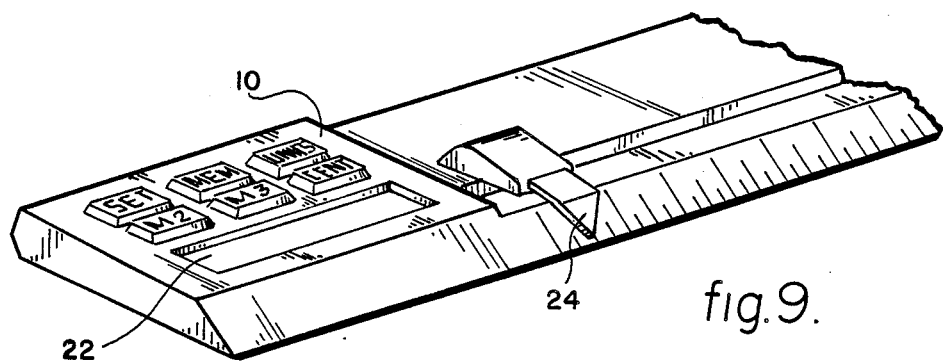
FIG. 9 is a perspective view of an alternative embodiment of a device according to the invention.

FIG. 9 is a perspective view of an alternative embodiment of this invention having the major portion of the electronics system and the display 22 located in the main body 10 of the instrument, with only the photoelectric sensor unit in the slider assembly attached to pointer 24, connected by flexible leads or slip rails. This arrangement is more suitable when it is desired to provide additional features such as a larger number of control push-buttons; for example the six shown could provide, in addition to the "set", "memory" and "units" functions shown previously in the preferred embodiment, a second and third memory function and a centering function. The centering function was described in reference to FIG. 2, and additional memory functions would be implemented as two further choices in step 162 of FIG. 6, in the manner of step 166.

Figure 10:
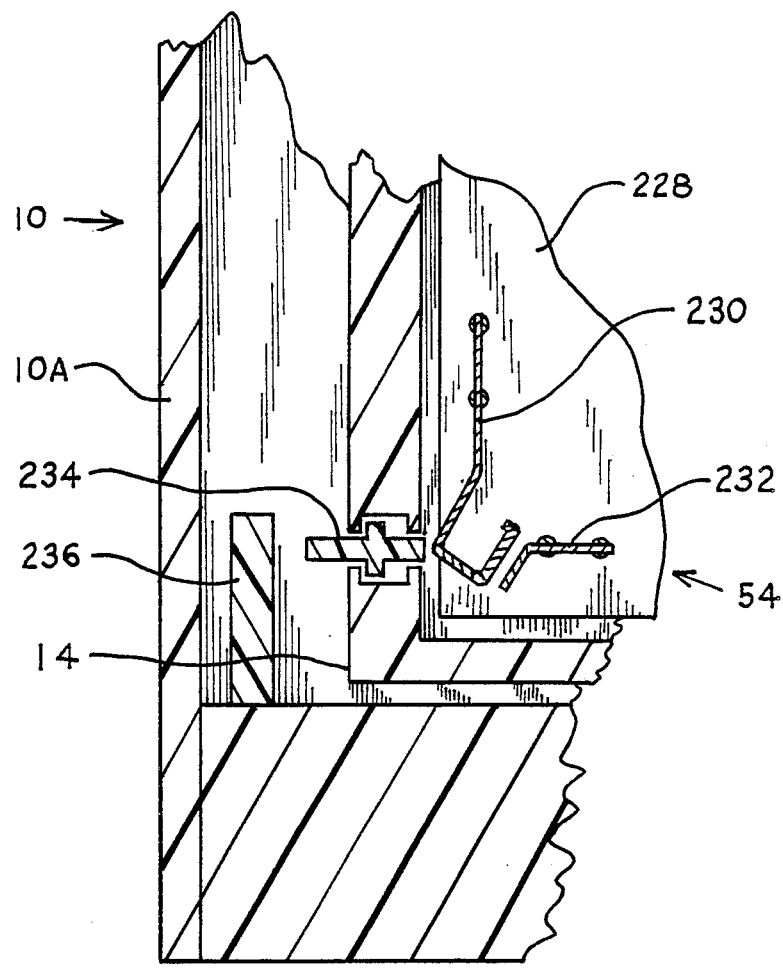
FIG. 10 is cross sectional plan view of the lower left corner of the ruler body and slider as shown in FIG. 2, showing details of the home position sensing switch.

FIG. 10 is an enlarged cross-sectional plan view of the lower left hand portion of the ruler body 10 and slider 14 as shown in FIG. 2, taken through a plane below the panel 22 (FIG. 2) immediately above the main circuit board 228, shown in part in FIG. 10. Mounted on the circuit board 228 are two spring metal strips 230 and 232 forming the contact elements of home position sensing switch 54, also referred to as the "start" switch, as described in connection with FIG. 4. Contact 230, which is connected to common ground, has a movable lower portion adjacent to contact 232 which is substantially fixed. Contact 232 corresponds in FIG. 4 to the left hand terminal of switch 54, connected by the START bus to P46 of Port 4 of microprocessor 32. Referring again to FIG. 10, an actuating plunger 234 is captivated as shown within the left hand end wall of the slider 14 during initial assembly. Whenever the slider 14 is in an active location (away from "home" position) as shown, the lower movable portion of contact 230 remains spaced away from contact 232, thus switch 54 is in a "normally open" state. Whenever the slider is moved fully to the left to the "home" position, plunger 234, striking a stop 236 affixed to the body of ruler 10 near end panel 10A, forces contact 230 against contact 232 to close switch 54, initiating a counter reset and, if in standby mode, "awakening" the instrument. Then, when the slider 14 is moved away from the "home" position, switch 54 opens at the zero calibration point, reinitiating position counting. The functional operation and circuit interaction of home position sensing (START) switch 234 has been described in connection with FIG. 4. The mounting of stop 236 to the body of ruler 10 may be made adjustable as a calibration means to precisely establish the zero position of pointer 24 on scale 12 (FIG. 2).

Many possible alternative embodiments and options are possible, in addition to that shown in FIG. 9. One possibility is to provide a built-in hand calculator capability. As a further option, the instrument may be fitted with a computer interface to permit interactive operations with a separate computer system. Since the type of microcomputer utilized is equipped with built-in digital serial input/output capability, it is entirely feasible with minimal modifications to attach the instrument to the serial ports found on most desktop computers. In this mode, the instrument would become a "slave" to the host computer, and deliver distance measurements to it on command. The instrument could even make its display and audio annunciator available to the host for displaying prompt messages and guiding an operator through various measurement and scaling processes, as defined by the host's software program.

As alternatives to the specific algorithms disclosed, many other specific algorithms could be developed to implement the general principles of each of the novel features such as the adaptive sample rate adjustment.

The invention could be implemented with alternative types of microcomputers or with standard or custom integrated circuit logic. With the microcomputer type shown herein, due to its design and initial programming flexibility, many equivalent algorithms and software/hardware architectures could be found to accomplish the performance and the objectives of this invention The subject of this invention is susceptible to these and numerous other variations, substitutions and alternatives to the particular illustrative embodiments described herein; the scope of the invention is intended to encompass all such variations, substitutions and alternatives which may become obvious to those of skill in the art without departing from the spirit and intent of the invention as disclosed and claimed.

What is claimed is:

1. A distance-measuring instrument comprising:
    a scale having distinguishable divisional markings,
    a first gaging member disposed in fixed relation with said scale;
    a sensing device having a second gaging member disposed in fixed relationship therewith, movable along said scale and cooperating therewith in a manner to generate signals representing current distance gaged between said first and second gaging members; and
    electronic circuitry adapted to receive said signals, to register, display and store therefrom an initial distance reading, and then for each subsequent distance reading, to automatically calculate a proportioning factor expressing the ratio of said subsequent reading to said initial distance reading and display said proportioning factor.

2. A distance-measuring instrument according to claim 1 wherein said circuitry is adapted to display said proportioning factor as a percentage figure.

3. A distance-measuring instrument according to claim 1 further comprising:
a dry cell battery;
voltage regulator means adapted to receive power from said battery and to supply power to said electronic circuitry at a regulated voltage; and
battery condition indicating means adapted to provide a warning indication whenever voltage of said battery falls below a predetermined limit.

4. A distance-measuring instrument according to claim 3 wherein said battery condition indicating means comprises voltage sampling and dual comparitor means adapted to sample the battery voltage at predetermined intervals, and thereupon to cause a low battery voltage warning to be indicated if the battery voltage is sensed as being between a predetermined low limit and a predetermined very low limit, and to cause a very low battery voltage warning to be indicated if the battery voltage is sensed as being below said very low limit.

5. A distance-measuring instrument according to claim 1 wherein said electronic circuitry comprises a microcomputer adapated to provide the further capability of automatically calculating and displaying a proportioning factor relating a current distance measurement to a previously-stored reference distance measurement, further comprising:
a visual display device, and
user "set" input means enabling a user to enter a "set" command into said microcomputer to:
register and store an initial distance gaged between said first and second gaging members at the time said "set" command is entered.
set an instrument scale factor such that said initial distance will be displayed as unity proportioning factor.
continuously track and register any further movement of said sensing device; and derive therefrom a current distance,
calculate therefrom a current proportioning factor value by dividing said current distance by said initial distance, and
cause said current proportioning factor value to be displayed.

6. An instrument according to claim 5 further comprising:
audible output means connected to said microcomputer, the microcomputer being programmed such that upon command to enter a "Memory" mode, an initial reading becomes stored, and thereafter, said audible output device is made to emit a first sound effect whenever the current reading is less than the stored reading, a second sound effect, which may be defined as the absence of sound, whenever the current reading is equal to the stored reading within a specified tolerance, and a third sound effect whenever the current reading is greater than the stored reading, the first, second and third sound effects being made distinguishable from each other, whereby a user is enabled to manually relocate said indicator to a position corresponding to said stored reading by audible indication alone, without need of visual observation of instrument elements such as the indicator and the display device.

7. A distance-measuring instrument according to claim 5 further comprising "units" input means enabling a user to command said microcomputer, when in a distance mode, to convert distance readings for display in any of several pre-programmed units systems such as inches, centimeters and picas in said display device along with identification of the selected units system;
and, wherein said "units" input means is further adapted to enable a user to select a "User Units" mode in which the user is enabled to designate an arbitrary units system and to cause said instrument to scale and display readings in said arbitrary units system.

8. An instrument according to claim 7 wherein said microcomputer is adapted to enter a range-doubling mode, initiated by actuating said "set" input means while said sensing assembly is located at an end position, opposite a reference end position, defined by said first gaging member, such that the measuring range of the instrument is caused to be doubled and a range-doubling indication is caused to be displayed, said range-doubling mode being cancelable by moving said sensing assembly to said first end position.

9. A distance-measuring instrument comprising:
a scale, having clearly distinguishable divisional markings, said scale being affixed to a body of the instrument and said scale having a first gaging member disposed in fixed relationship therewith;
a sensing device, having a second gaging member disposed in fixed relationship therewith, movable along said scale and cooperating therewith to generate signals representing any current distance gaged between said first and second gaging members;
electronic circuitry adapted to receive and decode said signals, to register therefrom a reading of said distance, to convert said reading into any selected one of a plurality of preselected units systems, such as inches, centimeters and picas; and
user input means enabling a user to select any of said units systems, and to thus cause said electronic circuitry to display said reading expressed in said selected units system.

10. A distance-measuring instrument according to claim 9 wherein said electronic circuitry and said user input means are further adapted to enable a user to designate an arbitrary units system and to cause said reading to be converted accordingly and displayed in said arbitrary units system.

11. A distance-measuring instrument comprising:
a scale having clearly distinguishable divisional markings, said scale having a uniquely-distinguishable calibration marking at one end thereof:
a first gaging member disposed in fixed relationship with said scale;
a sensing device, having a second gaging member disposed in fixed relationship therewith, movable along said scale over a travel range having at one extreme end a home position immediately adjacent to a calibration position corresponding to sensing of said calibration marking, said first and second gaging members being made to coincide at said calibration position, whereby said sensing device, in cooperation with said scale, is enabled to generate signals representing any current distance gaged between said first and second gaging members;
electronic circuitry adapted to register and display distance data derived from said signals; and a home position sensing switch, disposed so as to be actuated each time said sensing device is moved to said home position, and adapted to thereupon reset and thus recalibrate said electronic circuitry;

whereby automatic recalibration of said instrument with respect to said calibration position is caused to be performed each time said sensing device is moved to said home position.

12. A distance-measuring instrument according to claim 11 wherein said electronic circuitry is further adapted to automatically initiate a low power standby mode in said instrument after a predetermined time period of absence of user input, to remain responsive to user-actuation of said home position sensing switch while in said standby mode, and, in response to such actuation, to restore said instrument to a fully-operating mode, whereby said instrument is enabled to automatically initiate a low-power standby mode when not in use, and a user is enabled to terminate said standby mode and restore said instrument to full operation, automatically recalibrated, by moving said sensing device to said home position.

13. A distance-measuring instrument according to claim 11 further comprising:

a dry cell battery and associated voltage regulator means adapted to supply power to said microcomputer at a regulated voltage, battery condition indication means adapted to periodically sample battery voltage and to automatically command said microcomputer to cause battery condition to be indicated on said display device.

14. A distance-measuring instrument according to claim 13 wherein said microcomputer is further adapted to provide a standby mode, automatically initiated after a predetermined time period of absence of user input, such that in said standby mode power is removed from said display device and said light-source, and said instrument assumes a low power standby mode in which said microcomputer retains most-recent data in memory and remains responsive to a subsequent user-initiated "Awaken" command.

15. An instrument according to claim 14 further comprising a home position sensing switch located within said ruler body and so disposed as to be actuated whenever said slider is moved to said first end position, said switch being adapted to thereupon generate said "Awaken" command to said microcomputer so as to (1) to reactivate all system functions including said display device and said light source, and (2) originate a "Reset" command input to said microcomputer;

thereby providing automatic recalibration of said instrument.

16. A distance-measuring instrument comprising
a scale, having optically distinguishable divisional markings,
an optical sensing ammsembly movable relative to said scale and cooperating therwith to generate signals representing displacement of said sensing assembly relative to said scale, said sensing assembly including a light source and means for pulsing said light source at an adjustable sampling rate, and
rate control means responsive to the velocity of movement between said sensing assembly and said scale to adjust said sampling rate in accordance with a predetermined relationship.

17. A distance-measuring instrument according to claim 16 wherein said rate control means adjusts said sampling rate to a low value when said velocity is zero.

18. A distance-measuring instrument according to claim 16, further comprising:

an elongated main body having a first end and a second end, and having a first gage member, which may be an end mark of a ruler scale on said body, near said first end;

a slider assembly, containing said optical sensing assembly, movable along said body within a travel range between a first end position and a second end position, said first end position being immediately adjacent to a calibration position of said slider assembly corresponding to sensing of said end reference mark;

a second gage member, which may be a pointer, disposed in fixed relationship with said slider assembly so as to align with said first gage member when said slider is located at said calibration position;

electronic circuitry adapted to receive said signals generated by said sensor assembly and to register therefrom measurement data representing distance gaged between said first and second gage members; and a display device, cooperating with said electronic circuitry to display said measurement data.

19. A distance-measuring instrument according to claim 16 wherein said rate control means is responsive to movement of said sensing assembly relative to said scale to cause said sampling rate to vary in a manner providing increased immunity against errors due to rapidity of said movement.

20. A distance-measuring instrument according to claim 19 wherein said rate control means increases said sampling rate upon increase of rapidity of said movement.

21. A distance-measuring system comprising:
an elongated body having affixed thereto a scale having optically distinguishable divisional markings;
a sensing assembly, having a light source illuminating said scale, said assembly being movable relative to said scale and adapted to sense light from said source through an optical path including a selected portion of said scale to generate signals representing displacement of said sensing assembly relative to said scale; and
indicator means for indicating both the displacement of said sensing device from a predetermined position along said scale and the direction of said displacement.

22. A distance-measuring system according to claim 21 wherein said indicator means comprises:
a visual display panel; and
electronic circuitry adapted to receive said signals, to decode and register data therefrom representing displacement and direction of said sensing assembly relative to a reference position on said scale, and to cause said data to be displayed on said visual display panel.

23. A distance-measuring instrument according to claim 22 wherein said visual display panel has a numeric portion and an auxiliary portion, and wherein said electronic circuitry is adapted to display displacement of said sensing assembly from said predetermined position as a numeric value in said numeric portion, to display a directional arrow in said auxiliary portion, said arrow being made to point in a direction depending upon the direction of current displacement of said sensing assembly from said predetermined position, and inhibit display of said arrow in response to such displacement within a specified tolerance of said predetermined position.

24. A distance-measuring system according to claim 21 wherein said indicator means includes
an audible output device; and
means for causing said audible device to emit a first sound effect in response to a displacement of said sensing device from said predetermined position in one direction, and a second sound effect, distinguishable from said first sound effect, responsive to such displacement in the opposite direction.

25. A distance-measuring system according to claim 24 including means for producing a third sound effect in response to such displacement within a specified tolerance of said predetermined position.

26. A distance-measuring instrument according to claim 25 wherein said first and second sound effects are made to have descending pitch when said slider is moved toward said stored position, and wherein said third sound effect is defined and implemented as an absence of sound.

27. A distance measuring instrument comprising:
an elongated body;
a first reference mark located near a first end of said body;
a second reference mark located near the opposite end of said body;
a slider assembly movable along said body between an initial position, corresponding to said first reference mark, and an extreme position corresponding to said second reference mark;
an indicator device for digitally providing an indication of the displacement of said slider assembly from said initial position as a measure of distance gaged between said first reference mark and and a reference point on said slider; and
means for making measurements longer than said body, comprising means responsive to movement of said slider assembly to said extreme position for adapting said indicator device to indicate said displacement to said extreme position plus the displacement of said slider assembly from said initial position to a new final position;
whereby, upon shifting said instrument longitudinally from an original position so as to cause said first reference mark to coincide with a noted previous position of said second reference mark, said instrument will indicate a measurement from the original position of said first reference mark to a new final position between said first reference mark and second reference mark,
thus enabling said instrument, when utilized in the manner of an ordinary ruler measuring distances ranging between its full length and twice its full length, to display a result of such measurement directly.

28. A method of scaling distance measurements with an apparatus having an elongated body and a slide assembly movable along said body, said slide assembly having an initial position on said body, and including means for registering the displacement of said slide assembly from said initial position on said body, said method comprising the steps of
moving said slide assembly from said initial position to a predetermined position by a first displacement,
storing said displacement in a memory,
displacing said slide assembly to a second position having a second displacement from said initial position, calculating the ratio of said second displacement divided by said first displacement, and automatically indicating and storing said ratio to set a scaling factor,
moving said slide assembly to one or more additional positions, and
at each of said additional positions, registering the displacement of said additional position from said initial position, adjusted by said scaling factor, whereby said additional position is scaled to said first displacement.

29. The method of operating a hand-held distance-measuring instrument in a manner to center an object within an arbitrary span, said instrument having (a) an elongated body with a reference mark, (b) a slide assembly movable along said body, (c) an indicator registering the displacement of said slide assembly from said reference mark, (d) "Set" user input means for setting an instrument scale factor at a user-selected first position of said slide assembly corresponding to a first distance reading, such that said indicator is caused to display a unity reading, whereby a second distance reading at a second position of said slide assembly will be displayed as a proportion related to said first reading and (e) "Centering" user input means adapted to double said instrument scale factor without altering the displayed value of a current reading, so as to cause the displayed value from any subsequent movement of said slide to change at twice a normal incremental rate relative to displacement; said method comprising the steps of:
placing said reference mark at a first edge of said object,
moving the slider to a first position at a second edge of said object, opposite its first edge,
actuating said "Set" user input means, thereby setting said instrument scale factor to display a unity reading on said indicator,
placing said reference mark at a first edge of said arbitrary span,
moving the slider to a second position at a second edge of said arbitrary span, opposite its first edge, thus producing a second displayed reading,
actuating said "Centering" user input means, whereby said instrument scale factor is caused to be doubled without altering said second displayed reading,
moving said slider assembly so as to locate it in a third position wherein a unity reading is displayed on said indicator, and
moving said object until its second edge is aligned with said third position of said slider assembly, whereupon said object is now centered in said arbitrary span.

* * * * *